United States Patent [19]

Abbe

[11] 3,815,111
[45] June 4, 1974

[54] APPARATUS FOR INDICATING AN OBJECT REVERSAL OF DIRECTION
[75] Inventor: Robert C. Abbe, Newton, Mass.
[73] Assignee: Ade Corporation, Watertown, Mass.
[22] Filed: July 28, 1972
[21] Appl. No.: 276,115

[52] U.S. Cl............................................ 340/213 R
[51] Int. Cl............................................. G01r 29/12
[58] Field of Search............ 340/258 D, 420, 213 R

[56] References Cited
UNITED STATES PATENTS
3,218,623  11/1965  Buntenbach................... 340/258 D
3,564,529  2/1971   Kaufman......................... 340/420 X Primary Examiner—Harold I. Pitts
Attorney, Agent, or Firm—Chittick, Thompson & Pfund

[57] ABSTRACT

An apparatus containing a transducer and which provides an output signal when an object which is moving toward the transducer reverses direction to move away from the transducer. The transducer provides a signal which peaks in response to the direction reversal. In one embodiment of the invention, the transducer signal is initially differentiated. In another embodiment of the invention, the transducer signal is fed to a peak reader circuit adapted to provide a first output which rises until the peak of the transducer signal occurs and a second output that crosses zero when the transducer signal stops rising. In both of these embodiments, a zero-crossing detecting circuit is thereafter used to provide a signal in response to either the differentiated signal or the second signal from the reader circuit. The output of this zero-crossing detecting circuit thus indicates the object's reversal of direction. Another embodiment of the invention indicates the difference between the object's position at a particular time with respect to its position at which it previously changed direction. Other embodiments of the invention are adapted to indicate the time difference between the occurrence of an event and the occurrence of the object's direction reversal. The above embodiments are particularly useful in determining the occurrence of top dead center of a piston in an internal combustion engine and for timing the occurrence of top dead center with respect to the piston's spark. In still another embodiment of the invention, an indication of the rises and depressions in the surface of a base circle of a camshaft is provided. Preferably, the transducer utilized when determining top dead center is a capacitive probe having a spherical or hemispherical measuring electrode.

31 Claims, 13 Drawing Figures

APPARATUS FOR INDICATING AN OBJECT REVERSAL OF DIRECTION

BACKGROUND OF THE INVENTION

This invention generally relates to an apparatus which is adapted to provide an output signal in response to a reversal in direction of an object.

In numerous situations, it is either necessary or desirable to ascertain when a reciprocating object changes its direction. One particular situation is to determine when a piston in an automotive internal combustion engine is at its top dead center position. The ascertainment of top dead center in automobile engines has great importance at the present time due to the efforts being made to control the engine's exhaust emissions. By correctly timing the firing of the several spark plugs of the engine in their respective cylinders, emissions are substantially reduced over those that would occur with a poorly timed engine.

Another problem encountered within the automobile industry concerns the manufacturer's checking of camshafts to see if they meet specification before they are mounted within the automobile. Until the present time, no fast, reliable, accurate and efficient system existed for this purpose.

OBJECTS AND SUMMARY OF THE INVENTION

It is an object of this invention to privde an apparatus having a transducer and which is adapted to indicate the reversal in direction of an object moving toward and away from the transducer, which apparatus is efficient, accurate, inexpensive and reliable.

It is a further object to provide such a transducer apparatus which is particularly useful in indicating the time of top dead center of a piston in an internal combustion engine.

It is a further object of this invention to provide an apparatus which is adapted to indicate the difference between an object's present position and a position at which it previously changed direction.

It is a further object to provide such an apparatus adapted to indicate the difference between a piston's present position near the top of its stroke and the piston's top dead center position.

It is a further object to provide such a transducer apparatus which is adapted to provide an indication of the time between the occurrence of a selected event and a reversal in direction of an object moving toward and away from the transducer.

It is a more particular object to provide such an apparatus which is adapted to provide an indication of the timing of the spark in a cylinder of an internal combustion engine with respect to top dead center of the piston.

It is a further object to provide such a transducer apparatus which is adapted to provide an indication of rises and depressions in a portion of a surface where the location of the portion is indexed with respect to a particular feature of the surface.

It is a more particular object to provide such an apparatus which is adapted to provide an indication of the depressions and rises in a surface comprising a portion of the base circle of an automobile camshaft.

It is a still further object of this invention to provide such a transducer apparatus which is adapted to generate a quantitative measure of the amount of travel an object undertakes when moving back and forth with respect to the transducer.

It is still an additional object of this invention to provide a capacitive probe which is adapted to provide an accurate output signal in response to the situation which is being probed substantially irrespective of the angle with which the probe approaches the situation.

It is still an additional more specific object of the invention to provide a capacitive probe which is particularly useful for ascertaining top dead center of a piston within a cylinder.

These and other objects are achieved according to the invention by an apparatus which includes a transducer and is adapted to provide an output signal in response to a reversal in direction of an object moving toward and away from the fixed point at which the transducer is located. The output of the transducer peaks in response to the object's direction reversal. In one embodiment of the invention, this signal is differentiated and thereafter fed to a zero-crossing detecting circuit which provides an output when the differentiated signal crosses zero, thereby indicating the time of the object's direction reversal. In another embodiment of the invention, the transducer signal is fed to a peak reader circuit which provides a first signal that increases until the peak of the transducer's signal occurs and a second signal which crosses zero at the time the transducer signal stops rising. The second output signal of the peak reader circuit is then fed to a zero-crossing detecting circuit.

The above two embodiments are particularly useful in providing an output signal precisely when a piston in a cylinder of an internal combustion engine is at its top dead center position.

In another embodiment of the invention, the difference between the object's present position and a position at which it previously changed direction is indicated by comparing the present value of the transducer signal with the value of the first signal provided by the peak reader after it had stopped increasing when the object previously changed direction. This may be used to indicate the difference between a piston's present position near the top of its stroke and its top dead center position.

In other embodiments of the invention, the time difference between the occurrence of an event and the occurrence of a reversal in direction of an object moving toward and away from the transducer may be ascertained. In one of these embodiments, a ramp generator is used to provide a constantly increasing output voltage and the values of this output voltage at the occurrence of the event and the occurrence of the object's direction reversal are compared. In another one of these embodiments, the difference between the value of the transducer's present signal and the value of the first signal from the peak reader at top dead center is sampled at the occurrence of the event. These embodiments are particularly useful in determining the timing difference between the occurrence of top dead center of a piston in an internal combustion engine and the occurrence of the spark in the cylinder. The timing of the engine is thus ascertained so that it may be corrected if necessary.

With still another embodiment of the invention, the transducer apparatus is used to ascertain rises and depressions in a surface, e.g., a portion of the base circle of a camshaft. The camshaft is made to revolve and the particular portion of interest of the camshaft's surface is referenced with respect to the lobe of the camshaft. The time at which the lobe passes a fixed point is ascertained with an apparatus of the type disclosed as either of the first two embodiments with the transducer loated at the fixed point. Thus, the output of either of the first two embodiments is utilized as an index signal and the rotation of the camshaft may thereafter be tracked. A second transducer is placed at a second fixed point whose location is known with respect to the first fixed point and which is adjacent the revolving camshaft. The second transducer provides an output signal which varies in response to the distance between itself and the surface. When appropriate circuitry indicates that the part of the base circle surface of interest is adjacent this second transducer, the output from the second transducer is applied to a circuit which provides another signal that indicates the difference between the highest rise and lowest depression in the portion of interest of the camshaft's surface. Although this embodiment is particularly useful with a closed rotating surface such as a surface of a revolving camshaft, it is also generally applicable to indicate depressions and rises in other surfaces. Further, this embodiment can, in general, be used for providing a measure of the distance traversed by an object whose surface is moving successively toward and away from a fixed point where the second transducer is placed.

Additionally, a preferred form of transducer is provided which is particularly useful for being placed within the cylinder of an internal combustion engine to ascertain top dead center of the piston in that cylinder. The transducer preferably comprises a capacitive probe having a hemispherical or spherical measuring electrode which is adapted to sense the moving object piston. The shape of the measuring electrode allows the transducer probe to provide an output which is substantially not influenced by the angle the probe makes with the direction of motion of the piston.

DESCRIPTION OF THE PREFERRED EMBODIMENTS

Figure 1:
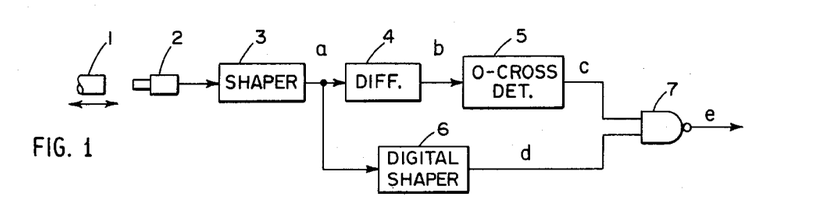
FIG. 1 is a schematic block diagram of a preferred embodiment of the invention which is adapted to provide an output signal in response to the occurrence of the top dead center position of a piston.
Figure 2:
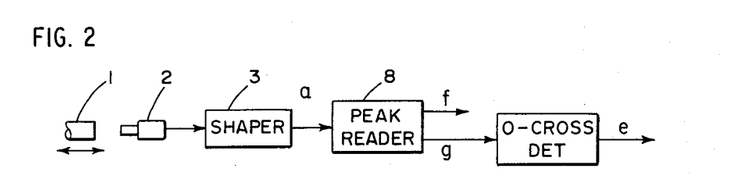
FIG. 2 is a schematic block diagram of another preferred embodiment of the invention for providing an indication of the top dead center position of a piston.

FIGS. 1 and 2 show two separate embodiments of the invention which are adapted to provide an output signal in response to each occurrence of a reciprocating piston 1 reaching its top dead center position. In these two figures, like elements, are given the same reference numerals.

Figure 1A:
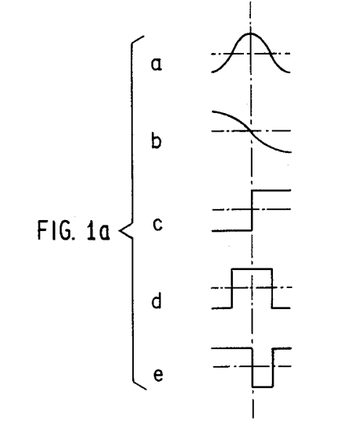
FIGS. 1a and 2a are respectively waveform diagrams of the signals at the indicated points in FIGS. 1 and 2.

The signals occurring within the embodiment of FIG. 1 are shown in FIG. 1a. In FIG. 1, a transducer 2 is positioned at the top of the cylinder within which piston 1 is reciprocating. Preferably, this transducer is a capacitive probe of the type disclosed and claimed in copending application Ser. No. 64,240; filed Aug. 17, 1970; by the same inventor as the present application. Preferred forms of the probe will be discussed below in connection with FIGS. 9 and 10. However, the subject invention is not limited to a capacitive probe but other probes which provide an output similar to the one disclosed may be used. A suitable transducer must provide an extended output which is proportional to the distance between itself and the piston, i.e., its signal peaks at the top dead center location where the piston reverses direction from moving toward the transducer and begins to move away from the transducer.

In FIG. 1, the analog output of the transducer is fed to a shaper circuit 3. In effect, the shaper circuit may be considered as part of the transducer since its function is solely to linearize the transducer output so that a signal as that designated $a$ in FIG. 1a indicating the distance between the transducer and piston is provided. As indicated, the $a$ signal is essentially a sine curve. The $a$ signal is applied to a differentiating circuit 4 which provides the indicated $b$ signal at its output. The signal $b$ crosses zero at the peak of the $a$ signal where the $a$ signal stops increasing and begins to decrease. Thereafter, the $b$ signal is fed to a circuit 5 which provides the output $c$ in response to the differentiated signal $b$ crossing zero. Circuit 5 may be, for example, a Schmitt trigger referenced to zero voltage. The $c$ signal is indiated as a digital signal which has a low to high transition in response to the zero crossing in signal $b$. However, the signal provided by the zero crossing detecting circuit 5 could be any circuit which provides an indication in response to such a zero crossing. Thus, the output $c$ of the circuit 5 occurs at precisely the peak of signal $a$ which corresponds to the top dead center occurrence of piston 1.

A digital shaper circuit 6 is also provided which is adapted to receive the signal $a$ and convert it to an appropriate digital pulse as that designated $d$. The shaper circuit 6 may be of any of the well known types; for example, it may be a threshold responsive circuit which provides a low to high transition when the signal $a$ reaches a predetermined level and thereafter a high to low transition when the signal $a$ decreases below the threshold level. The signal $d$ from shaper circuit 6 is a gating pulse and is applied to NAND gate 7 so that the NAND only provides an indication in response to the low to high transition of signal c during the gating interval. The gating pulse d is utilized so that an output of the circuit is only provided at a high peak in signal a indicating close proximity between the transducer 2 and piston 1 and not at a low peak indicating that the piston is at its farthest position from the transducer. The output of NAND is designated e and its high to low transition is the output of the circuit indicating top dead center.

Figure 2A:
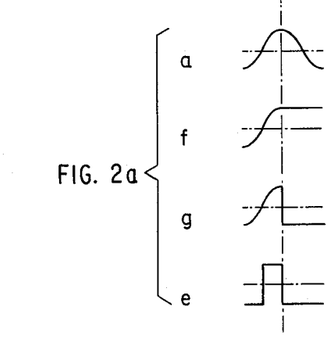

Referring now to the embodiment of FIG. 2 and the waveforms of FIG. 2a, the output of transducer 2 is again fed to a shaper 3 which provides the a signal peaking when the piston is closest to the transducer (top dead center). However, in FIG. 2 the a signal is fed to a peak reader circuit 8 which provides a first output f that corresponds to the increasing signal a and increases until the peak of signal a is sensed; thereafter, the output f of the peak reader 8 holds at the level at which it had stopped increasing. The peak reader 8 also provides output g which initially corresponds to the signal f but crosses zero from high to low when signals a and f stop increasing. The g signal is applied to a zero-crossing detector 10 which, in response to the high to low zero-crossing in signal g, provides a high to low transition in the output e of the circuit. This high to low transition of signal e indicates when the piston 1 is at its top dead center position.

Thus, with the embodiments of FIGS. 1 and 2, an electrical indication is provided in response to the top dead center position of the piston in the cylinder. This indication may be utilized in several ways as will be shown in the embodiments to be discussed subsequently.

It should be noted that in FIGS. 1 and 2 and other figures in this application are block schematics and the elements shown as blocks are intended to represent any circuit which is able to perform the function designated.

Figure 3:
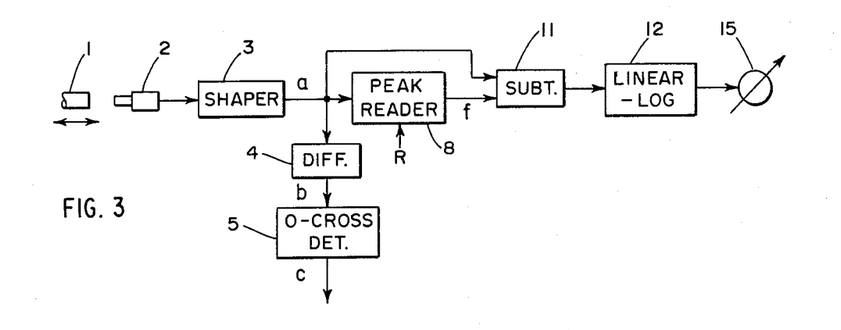
FIGS. 3 and 4 are schematic block diagrams of other preferred embodiments of the invention which are adapted to indicate the difference between the present position of a piston near the top of its stroke and the piston's top dead center position.
Figure 4:
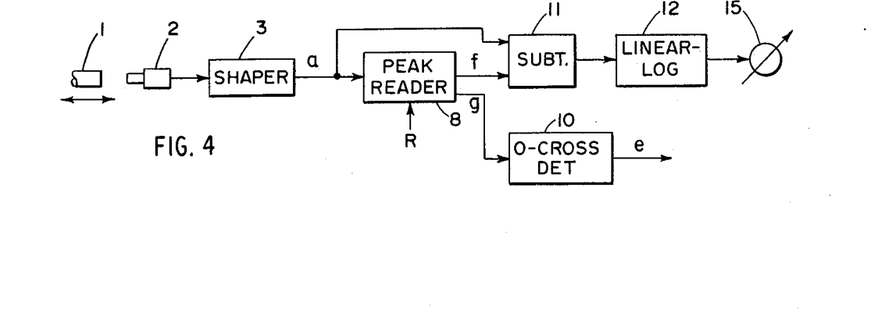

With respect to FIGS. 3 and 4, embodiments of the invention are disclosed which provide an indication of the difference between the present position of the piston when it is near the top of its stroke and the piston's precise top dead center position. In FIG. 3 elements having counterparts in FIG. 1 are disclosed and in FIG. 4 there are shown elements corresponding to those shown in FIG. 2. As above noted in discussing FIGS. 1 and 2, like elements in this application are given the same reference numeral.

With particular respect to FIG. 3, the distance between the piston 1 and transducer 2 is sensed, applied to shaper 3, and thereafter differentiated by circuit 4 which provides its output to zero-crossing detector 5 so that an output is provided indicating top dead center as previously disclosed. The digital shaper 6 and NAND 7 of FIG. 1 are also utilized in the manner described above but these are not shown. With respect to FIG. 4, the transducer 2 senses the distance between the piston 1 and itself and provides a signal to shaper 3 whose output is applied to peak reader 8 so that the zero-crossing detector 10 provides an output indicating top dead center of the piston in the same manner as in FIG. 2.

However, the embodiment of FIG. 3 also has a peak reader 8 like that contained within the embodiment of FIG. 4. In FIG. 3, the output signal a of the shaper 3 is applied to the peak reader 8 as well as to the differentiator 4. The output of the peak reader 8 which is the signal f in FIG. 2a is applied to a subtraction circuit 11.

As above indicated in discussing the embodiment of FIG. 2, the peak reader circuit provides a signal which increases at a rate corresponding to the increase in signal a while the piston 1 is moving toward the transducer 2. At the piston's top dead center location, the output f of the peak reader 8 levels off. The subtraction circuit 11 receives this leveled-off signal and is adapted to utilize it as a reference indicating top dead center. The subtraction circuit also receives the signal a from the shaper 3 so that it is provided with contemporary indications of the piston's position on successive strokes when the piston is near its top dead center position. Subtraction of the value of signal a at any time when the piston is near the top of its stroke from the value of the leveled-off signal f will provide an indication of the difference between the position of the piston at that particular time and its top dead center position.

The output of the subtraction circuit 11 is fed to a gauge 15 via a converting circuit 12. The converting circuit 12 is used since the distance between the piston's top dead center position and the position of the piston near the top of its stroke at the particular time of interest will be very small as the piston approaches top dead center. The conversion circuit 12 converts the output of the subtraction circuit 11 to a logarithmic scale which is adapted to magnify the differences sensed at the top of the piston's stroke. When the conversion circuit 12 is utilized, the gauge 15 also operates in a logarithmic manner to provide in essence a magnification of the small distances between the top dead center position of the piston and its succeeding positions that are very close to top dead center.

The embodiment shown in FIG. 4 is also provided with a subtraction circuit 11, conversion circuit 12 and gauge 15 which operate in the manner just described in FIG. 3.

The peak readers 8 in FIGS. 3 and 4 are provided with reset inputs designated R. Signals at these reset inputs operate to inhibit the peak reader from maintaining its leveled-off signal and reset the circuit to its initial state. In both embodiments, the reset signal may be manually generated by a push button or generated when the a signal from the shaper reaches a predetermined negative value as it decreases from its peak.

Figure 5:
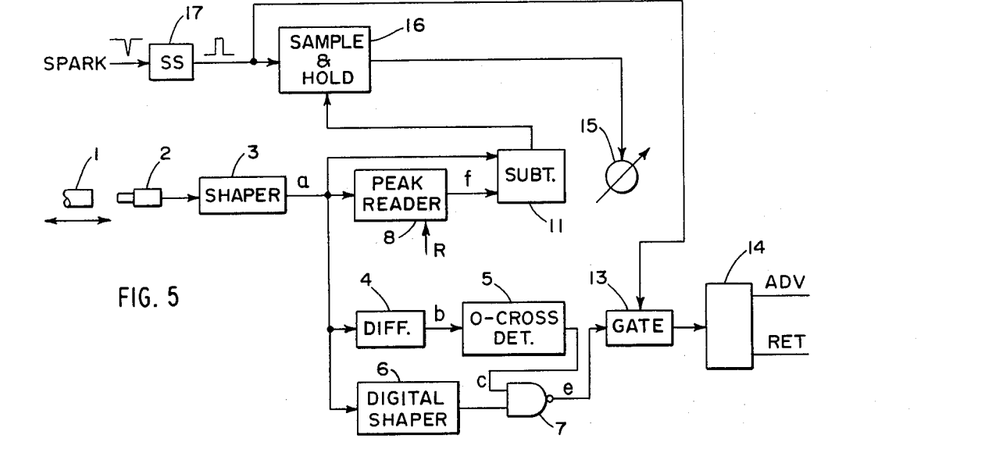
FIGS. 5 and 6 are schematic block diagrams of two further preferred embodiments of the invention which are adapted to provide an indication of the timing difference between the occurrence of top dead center of a piston in an internal combustion engine and the occurrence of the spark in that cylinder.
Figure 6:
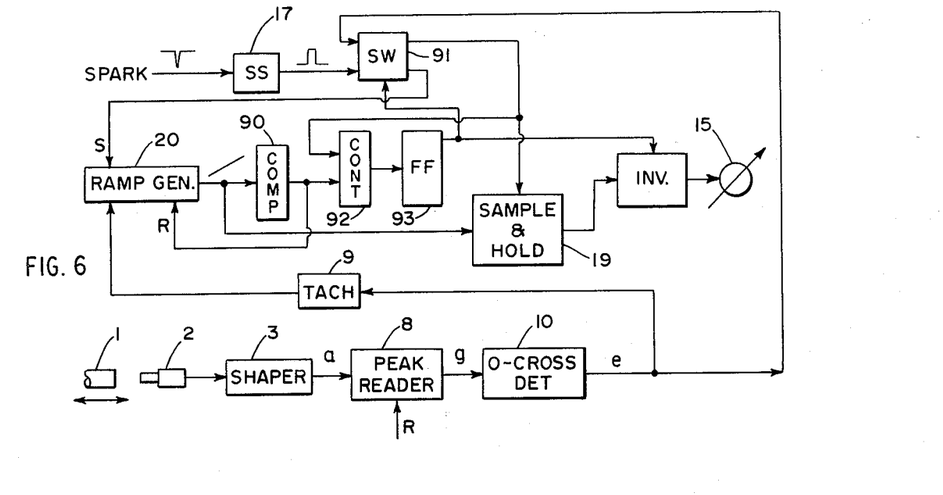

The embodiments disclosed in FIGS. 5 and 6 not only provide an indication of the occurrence of top dead center but are also adapted to provide an indication of the timing relationship between the occurrence of top dead center by the piston and the occurrence of the spark for the cylinder. Preferably, an indication is provided of the number of degrees of the engine's cycle by which the spark lags or leads top dead counter.

In FIG. 5, the interaction between the piston 1, transducer 2, shaper 3, differentiating circuit 4, zero-crossing detecting circuit 5, digital shaper 6 and NAND 7 are as has been disclosed with reference to FIG. 1. Thus, signal e at the output of the NAND 7 provides an indication of the occurrence of top dead center. Additionally, however, the spark in the cylinder is applied by appropriate means to trigger a single-shot 17 which provides a digital pulse of small predetermined duration. This pulse is applied to a gate 13 along with the single e from the NAND gate 7. Gate 13 is adapted to control an output register 14 which has ADV and RET outputs. The gate 13 functions to control register 14 so that a signal is fed from its ADV output when the pulse from single-shot 17 leads the negative-going transition in signal *e* indicating top dead center; the ADV output thus indicates that the spark leads the occurrence of top dead center of the piston. Conversely, gate 13 operates register 14 to provide a signal on its RET output when the negative-going transition of signal *e* leads the pulse from the single-shot 17; this indicates that the spark lags the occurrence of top dead center.

Besides indicating whether or not the occurrence of top dead center lags or leads the spark, the embodiment of FIG. 5 provides an indication of the extent in degrees of such lag or lead. As indicated, the signal *a* from shaper 3 is fed to a peak reader 8 and subtraction circuit 11 in the same manner as previously described in FIGS. 3 and 4. As also disclosed with reference to the embodiments of FIGS. 3 and 4, the leveled-off signal *f* received by the subtraction circuit during a previous piston stroke is used as a reference indicating top dead center. Thus, on successive strokes, the contemporary output of the subtraction circuit 11 continuously indicates how far the piston is from its top dead center position. This varying output from circuit 11 is fed to a conventional sample and hold circuit 16 which also receives the output from single-shot 17 indicating the sparks occurrence. The sample and hold circuit 16 thus provides an output corresponding to the value of the output of the subtraction circuit 11 at the time of the spark. This output, of course, corresponds to the difference in time between the occurrence of the spark and top dead center as well as the position of the piston with respect to top dead center at the time of the spark. This indication from the sample and hold circuit may be fed to a suitable gauge calibrated in degrees of the engine's cycle as indicated by 15. As indicated, the peak reader 8 has a reset input operated in response to the signal *a* reaching a predetermined negative pulse as in FIGS. 3 and 4.

With respect to FIG. 6, a ramp generator 20 is illustrated which provides an output voltage which increases at an adjustable rate. In FIG. 6, the transducer's signal is fed in a similar manner as in the embodiment of FIG. 2 to a shaper 3, peak reader 8 and zero-crossing detecting circuit 10 which provides the output *e* indicating each time when the piston is at the top dead center position. The signal *e* is fed to a tachometer circuit 9 which is adapted to provide a variable voltage output depending on the pulse rate in signal *e* to generate a voltage output varying in dependence on the motion of piston 1 (i.e., the frequency at which the piston is at top dead center). This output from the tachometer circuit is fed to the voltage ramp generator 20 to control the slope of its output so that the output of the generator 20 always advances at a constant slope - volts per degree of engine revolution - irrespective of the speed of the engine.

The output from the ramp generator 20 is fed to a conventional sample and hold circuit 19 which is adapted to provide an output having a value corresponding to the value of the ramp generator output at the particular time a signal occurs at its sample input. This output is fed to control a gauge 15 through a selectively controlled inverter 12.

Also in FIG. 6, the spark is converted by suitable means to trigger a single-shot 17 which provides, in response, a pulse of predetermined short duration. This pulse may be applied to the sample and hold circuit 19 or to the start input 5 of the ramp generator under the control of switching circuit 91.

The *e* signal from the zero-crossing detector 10 is also applied, under the control of switching circuit 91, to either the sample input of the sample and hold circuit 19 or the start input of the ramp generator 20.

As shown, the output of the ramp generator 20 is fed back to reset itself through a comparator 90 once the generator's output has reached a predetermined value preset into the comparator. Besides resetting the ramp generator 20, the output of the comparator is applied to one input of a control circuit 92. The other input of the control circuit is received from that output of the switching circuit 91 which is applied to the sample and hold circuit 19. The control circuit 92 operates to control a flip-flop circuit 93 in a manner dependent on which of its two inputs leads the other. The ouput of the flip-flop 93 controls both the switching circuit 91 and inverter 12.

In operation, if it is initially assumed that top dead center of the piston leads the spark, the pulse of the *e* signal denoting top dead center will be applied through switching circuit 91 to the start S input of the ramp generator which will then provide a voltage output from the tachometer circuit 9. The output of the generator 20 is applied to the sample and hold circuit 19 which indicates the value of the generator's output when the pulse from single-shot 17 passes through switching circuit 91 to be applied to the sample input of the sample and hold circuit 19. This output indication from circuit 19 if fed through the inverter 12 to be displayed by gauge 15 which thereby indicates as a negative value the amount by which the spark lags the occurrence of top dead center. When the output of the ramp generator 20 reaches the value preset into comparator 20, the generator is reset.

However, if the spark leads the occurrence of top dead center, the resetting output of the comparator 90 will occur before the sample signal from the switching circuit 91 initiated by the pulse output of the single-shot 17. This condition is sensed by the control circuit 92 to switch the flip-flop 93 and change the state of the switching circuit 91 and to inhibit the inverter 12. Thus, with the switching circuit 91 switched the spark indicating output from single-shot 17 is applied to start the ramp generator while the *e* top dead center indicating signal is applied through the switching circuit to the sample input of the sample and hold circuit 19. The sample and hold circuit thereby provides an output indicating the amount by which the spark leads top dead center. Since the inverter 12 has been inhibited by flip-flop 93, this amount is indicated as positive on the gauge 15. The gauge 15 thus indicates whether the spark leads or lags top dead center as well as the amount of such lead or lag.

Figure 7:
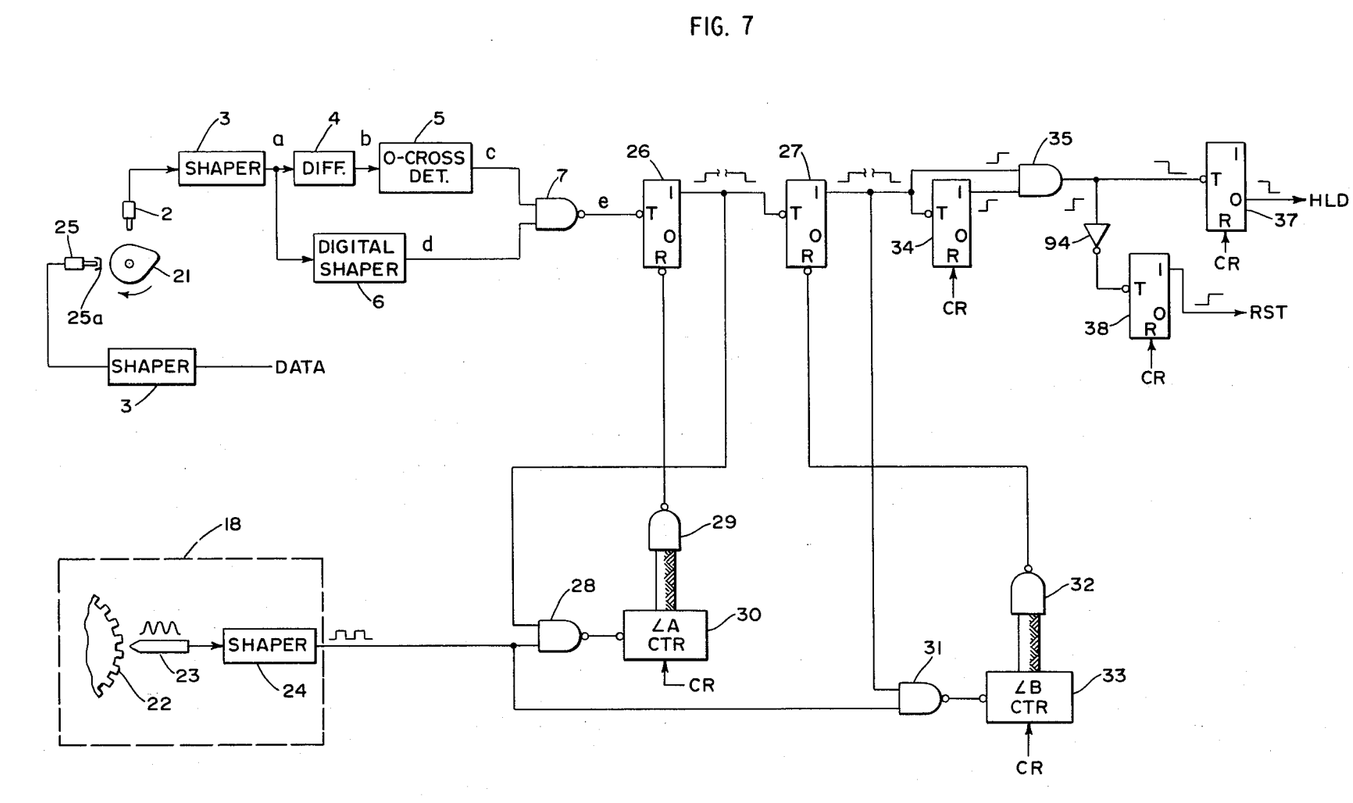
FIGS. 7 and 8, taken together, are a schematic block diagram of another preferred embodiment of the invention which is adapted to provide an indication of the rises and depressions in a portion of a base circle of a camshaft.
Figure 8:
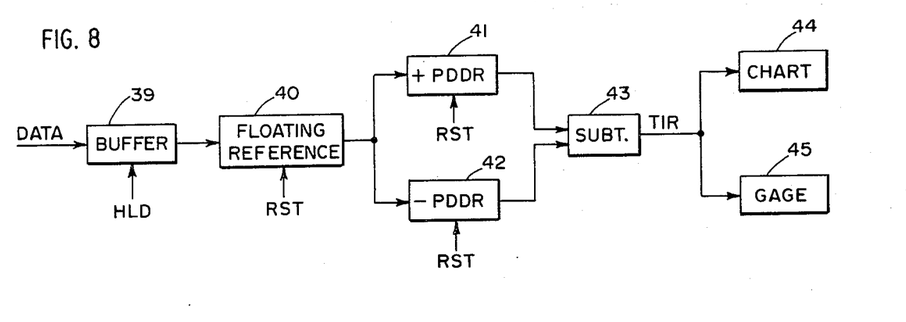

Referring now to FIGS. 7 and 8, a further embodiment of the invention is disclosed which is adapted to provide an indication as to whether a camshaft base circle meets specification within set tolerances. This embodiment of the invention provides an indication of the extent of the depressions and rises in the base circle surface of the camshaft. A quantitative output indicating the rises and depressions is provided so that by merely noting the output it may be determined whether or not the camshaft is within specification.

As indicated in FIG. 7, the camshaft 21 is mounted for revolution past a first transducer probe 2 and a second transducer probe 25. The probe 2 provides an output in response to sensing the lobe of the cam and this output is used to reference the timing of the measurement cycle. The transducer 25 senses the particular portion of the cam's base circle surface that is to be inspected. The transducer 2 is spaced farther away from the cam than is the transducer 25. This is due to the fact that the transducer 2 need only sense the cam's lobe which obviously extends farther from the cam's shaft than does its base circle. The transducer 25 which is to sense the base circle's surface has its sensing tip mounted in a slider 25a so that the tip may be pushed away by the lobe of the cam when the lobe passes the transducer 25. However, when the transducer probe 25 is sensing the surface of the base circle, it is not depressed but is positioned adjacent the circle. The two transducers 2 and 25 are located at fixed positions with respect to each other.

As also shown in FIG. 7, the apparatus includes a rotary incremental encoder 18 which may comprise a gear 22 having equally spaced teeth. The gear 22 is mounted axially with the cam and rotates along with the cam so that a timing transducer 23 may generate timing pulses that may be used to track the cam as it revolves. As indicated, the analog output of transducer 23 is converted into a series of equally spaced digital pulses by the shaper circuit 24.

The embodiment disclosed in FIGS. 7 and 8 may be considered as being made up of three portions. One portion comprises the transducer 2 which is adapted to sense the lobe of the cam 21 upon each cam revolution. The transducer 2 is the same type as disclosed above with the other embodiments and provides an output indicative of the distance between itself and the object that is being sensed. During each revolution the lobe approaches the transducer 2 and then falls away from it. Thus, the lobe has a component of its motion toward the transducer and, thereafter, away from the transducer. It is this component that is sensed by the transducer and appears to the transducer as an object approaching and moving away from it. Thus, the output of the transducer 2 is like those previously disclosed in the other embodiments for ascertaining top dead center of a piston. The output of transducer 2 will increase as the lobe approaches it, peak when the lobe is directly adjacent it, and, thereafter, decrease as the lobe moves farther along. This peak output of the transducer is fed to a shaper circuit 3, differentiating circuit 4 and zero-crossing detecting circuit 5 which correspond to the elements previously discussed in conjunction with FIG. 1. Similarly, the output of shaper 3 is converted into a gating pulse by the digital shaper 6 which gates the output $c$ of the zero-crossing detector 5 through NAND gate 7 to provide the $e$ signal as is done with the embodiment of FIG. 1. Thus, during each revolution and in response to sensing the cam's lobe, the transducer 2 causes a high to low transition in signal $e$ at the output of NAND 7. This transition signal is used as a reference or index for each inspection cycle.

The second portion of the embodiment being discussed includes the rotary encoder 18. This portion also includes a pair of programmable ring counters 30 and 33, each of which is adapted to provide an output in response to receiving a preselected number of timing pulses and thereafter reset itself. Functionally, the signal $e$ from the first portion of the apparatus is used as a reference point from which, by counting the number of pulses from the incremental encoder 18, the system ascertains when that portion of the cam's base circle that is to be measured passes the transducer 25. The count preset into counter 30 corresponds to the number of timing pulses from the encoder 18 which will occur between the time the lobe is sensed by transducer 2 and the time that the beginning of the portion of the cam's surface that is to be inspected is adjacent to the transducer 25. The count preset into counter 33 corresponds to the number of pulses derived from the encoder which will occur while the surface to be sensed passes transducer 25. Thus, the counts preset into counter 30 correspond to the angle (angle A) of revolution made by the camshaft 21 between the time that its lobe is sensed by transducer 2 and when the beginning of the portion of the surface to be sensed is adjacent transducer 25. The count preset into counter 33 corresponds to the angle (angle B) traversed by the camshaft while the surface portion to be sensed passes transducer 25.

As shown in FIG. 7, the output of NAND 7 is applied to the toggle input (T) of a latch flip-flop 26. The latch flip-flop 26 provides a low to high transition at its 1 output in response to a high to low transition at its T input. Thus, the 1 output of flip-flop 26 goes from low to high in response to the lobe becoming adjacent to transducer 2. This high signal from flip-flop 26 conditions a NAND 28 to enable it to pass the timing pulses to the counter 30. When these timing pulses have advanced counter 30 a predetermined number of times (which, as noted above, correspond to the angle made by the cam from when its lobe is sensed to when the beginning of the portion of its surface to be sensed is adjacent transducer 25), the counter enables NAND 29 to provide a low signal which is applied to the R input of flip-flop 26, thereby resetting it so that its 1 output goes low. This low output from flip-flop 26 is applied to a second latch flip-flop circuit 27 at its toggle (T) input. In response, this flip-flop 27 provides a low to high transition at its 1 output which is applied to NAND 31. In this manner, NAND 31 is enabled to apply the timing pulses to the second counter 33. As above noted, the second counter 33 is preset with a number corresponding to the angle made by the cam as that portion of its base circle surface to be sensed passes transducer 25. Upon reaching this selected count, the counter 33 enables NAND 32 to apply a low signal at the R input of the flip-flop 27. This causes the flip-flop 27 to terminate the high output at its 1 output. Thus, each revolution of the cam 21 causes flip-flop 27 to provide a low to high transition when the transducer 25 is adjacent the beginning of the portion of the base circle's surface to be sensed and a high to low transition when the portion 25 is at the end of that portion.

The signal from the 1 output of flip-flop 27 is also applied to a flip-flop 34 and an AND gate 35. It is generally desired that the camshaft should not be checked during its first revolution since irregularities in its motion may occur during this time. Thus, it is desired that the second lobe indication from NAND 7, rather than the first, be utilized for initiating checking the cam's base circle. The flip-flop 34 and AND gate 35 are provided for this purpose. Each low to high transition from flip-flop 27 is applied to AND 35 to thereby condition it. However, AND 35 will only pass a signal when the 1 output of flip-flop 34 is high. Before each inspection cycle, flip-flop 34 is reset by the cycle reset (CR) pulse at its reset input so that its 1 output is initially low. Flip-flop 34 is so constructed that its 1 output is made low only by a pulse at its reset input. The 1 output of flip-flop 34 will only go high in response to a high to low transition at its toggle (T) input. Thus, the first low to high transition from flip-flop 27 during the cam's first revolution will condition AND 35 but have no effect on flip-flop 34 so that the output of AND 35 will remain low. Thereafter, flip-flop 27 will provide a high to low transition which, although deconditioning AND 35, will cause flip-flop 34 to provide a high signal at its 1 output. Thus, AND 35 is conditioned by flip-flop 34 and upon receiving the next low to high transition from flip-flop 27 during the next cam revolution will provide a high signal at its output. In this manner, a high signal is provided at the output of AND 35 only during the second and successive revolutions of the cam.

Each low-high output from AND 35 is applied through inverter 94 to the toggle (T) input of a further flip-flop 38 causing its 1 output to go high. The signal from this 1 output of flip-flop 38 is designated RST. The flip-flop 38 also receives a cycle reset (CR) signal which occurs before each inspection cycle at its reset (R) input so that its 1 output is initially low. When its 1 output is high, flip-flop 38 remains in this state until a succeeding CR signal is received. As indicated, the CR signals also reset counters 30 and 33.

The signal from AND 35 is applied to another flip-flop 37 at its toggle (T) input. The high-low transition of the signal causes flip-flop 37 to provide a low HLD signal at its 0 output. The flip-flop 37 is also reset by the CR signal to cause it to initially have a high signal at its 0 output.

Thus, at the beginning of the inspection cycle, a high HLD signal is provided from flip-flop 37 and a low RST signal is provided from flip-flop 38. During the second revolution of the cam, the RST signal goes high when the beginning of that portion of the cam to be measured is adjacent transducer 25. Also, the HLD signal goes low when the end of this portion is adjacent transducer 25.

Figure 7A:
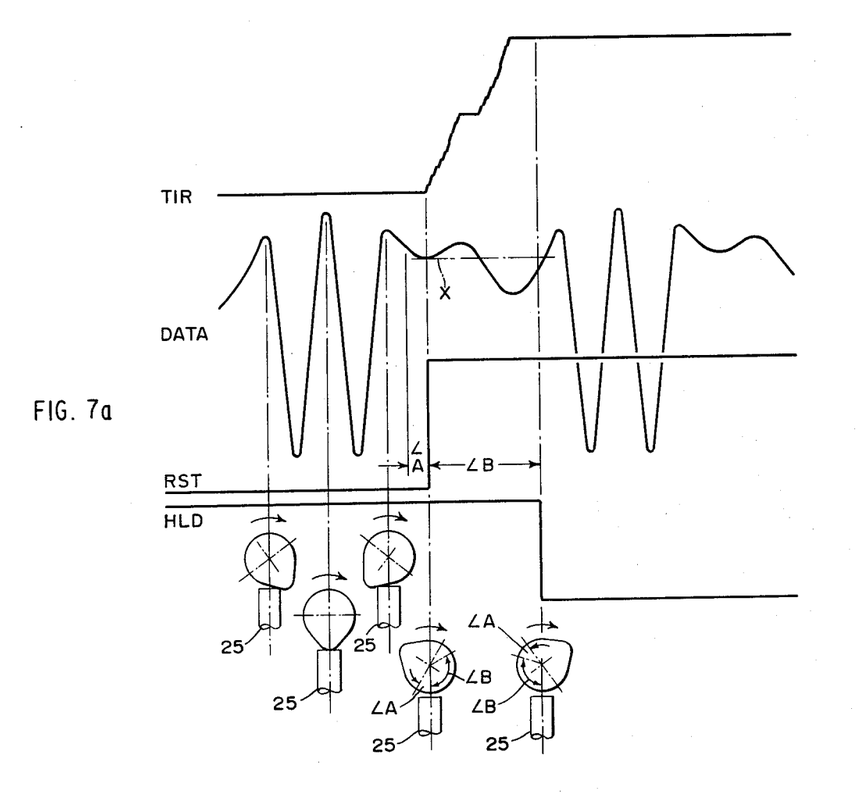
FIG. 7a is a diagram for illustrating the operation of the preferred embodiment of FIGS. 7 and 8.

The third portion of the embodiement being discussed consists of the transducer 25 and the circuit shown in FIG. 8. As in other embodiments, the output of the transducer 25 is fed through a shaper 3 and it provides an indication of the distance between itself and the surface of the camshaft as it passes the transducer. This output signal is designated DATA and shown in FIG. 7a along with an illustration of the relationship between the cam and transducer 25 at successive times. As shown in FIG. 7a, as the lobe revolves to a point adjacent the transducer 25, it pushes against one side of the slider in which the tip of the transducer is mounted. This pushes the transducer away from the cam. As the cam rotates further, its lobe no longer pushes against the side of the slider but rather passes directly over the transducer 25. At this point, the output signal from the transducer peaks since it is as close as it ever is to the cam surface. As the cam rotates further, its lobe passes from being directly over the transducer to along the slider so that the signal from the transducer reverses itself. As the cam's base circle passes the probe, an output as typically indicated by the curve in 7a is provided by the transducer. The irregularities in this signal from the transducer at this point correspond to the differences in the distance between itself and the cam's base circle or, more particularly, to rises and depressions in the surface of the base circle.

FIG. 7a also illustrates the HLD and RST signals. As indicated, the angle B (determined by the counter 33) corresponds to that portion of the base circle of the cam whose surface is to be sensed. The angle A corresponds to that portion of the base circle which passes the transducer 25 after the lobe has passed the first transducer 2. Thus, the RST signal rises at the end of angle A and the HLD signal falls at the end of angle B.

Referring to FIG. 8, the DATA signal is loaded into a buffer 39 which passes the DATA only when the HLD signal is high. Buffer 39 contains an analog gate which is conditioned by high HLD signals. From the buffer 39, the DATA signal is fed successively to a floating reference determining circuit 40. The circuit 40 provides an output which is referenced to a particular value, in particular, to the value of the DATA signal at the beginning of the angle B when the RST signal goes from low to high. Referring to FIG. 7a, this value is the value of the DATA signal designated as $X$ in the example shown. Of course, this designated value of the DATA signal corresponds to the distance between the transducer 25 and the beginning of that portion of the base circle surface of interest (i.e., the beginning of angle B).

FIG. 8 also illustrates a positive PDDR circuit 41 and a negative PDDR circuit 42. Initially, these two circuits are held at zero by the low RST signal.

The DATA signal, now referenced with respect to its value at $X$, is fed to the PDDR circuits 41 and 42 which become active in response to the RST signal going high at the beginning of angle B. The circuit 41 provides an output corresponding to increases in the DATA signal above the reference value $X$ caused by rises in the cam's surface. Similarly, circuit 42 provides an indication of decreases in the DATA signal below the value $X$ caused by depressions in the cam's surface. To obtain an indication of the extent to which depressions and rises occur in the surface with respect to the point on the surface occurring at the beginning of angle B, the outputs of 41 and 42 are subtracted by subtracting circuit 43. In effect, the subtracting circuit adds together the absolute values of the outputs from PDDRs 41, 42. This provides a signal designated TIR.

The elements of FIG. 8 operate in this manner until the HLD signal goes low indicating that the portion of the base circle corresponding to angle B has passed transducer 25. Referring to 7a for the typical situation illustrated the TIR signal is shown. An indication of the depressions and rises in the surface corresponding to the angle B is easily obtained by noting the height of the TIR signal obtained within angle B. Actually, the TIR signal is an indication of the amount the base circle surface in angle B moves toward and falls away from transducer 25 and indicates the difference between the highest rise and lowest depression within angle B. As shown in FIG. 8, the TIR signal may be graphically depicted via a chart 44. Such a chart would show the signal as illustrated in FIG. 7a. Also, the TIR signal may be fed to a guage 45 which will provide an indication of the TIR signal's height after the measurement cycle has been completed.

In checking the camshaft, an arbitrary limit proportional to the precision which is required in the camshaft is set for the height of the TIP signal. By merely comparing this arbitrary limit with the height of the TIR signal obtained, it is easily determined whether or not the camshaft meets its specification.

The portion of the circuit shown in FIG. 8 which provides the TIR signal (i.e., elements 39-43) consists of elements known in the art. Further, these elements may be obtained as a module assembly under Model No. 3114 from the ADE Corporation of Watertown, Massachusetts.

Figure 9:
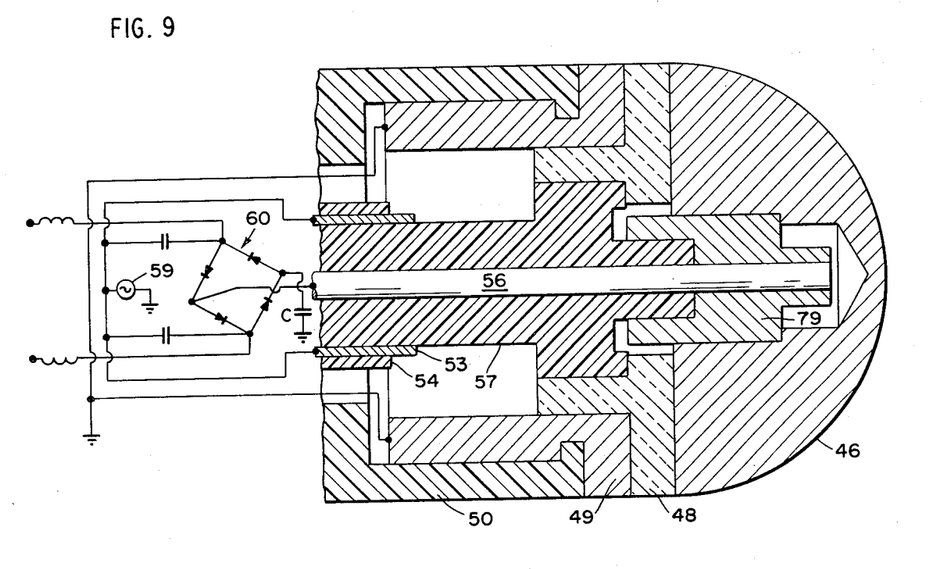
FIGS. 9 and 10 are partly sectional, partly schematic illustrations of preferred forms of probes to be used in the invention.
Figure 10:
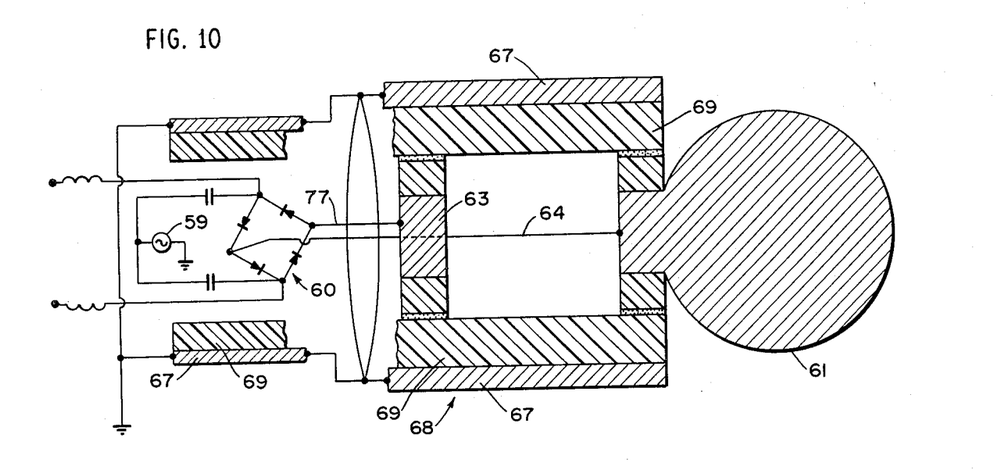

FIGS. 9 and 10 show preferred forms of the transducer probe to be used for determining the occurrence of top dead center. The transducer probes are capacitive and correspond to the probe disclosed and claimed in the above-identified copending application No. 64,240. However, the transducer probes of FIGS. 9 and 10 in the present application are substantially insensitive to the angle at which they approach the situation to be probed, i.e., the piston's movement. This is achieved by shaping the measuring electrode 46 in FIG. 9 as a hemisphere and the electrode 61 in FIG. 10 as substantially a sphere.

Referring to FIG. 9, the tip of the probe is shown in cross-section and the measuring circuit is shown schematically. The probe comprises a cylindrical housing 50 and a hemispherically shaped measuring electrode 46. The measuring electrode is electrically connected to the circuit illustrated by electrically conductive element 79 and shaft 56. An insulating member 57, preferably of Teflon, is provided around the shaft 56. A guard 53 in the shape of a sleeve is also provided and is abutted on both sides by the insulating element 57 and an insulating sleeve 54. A circumferential ground electrode 49 is provided and connected to the circuit.

The measuring electrode and a ground-referenced capacitor C are connected in the circuit to a diode matrix 60 as indicated. The circuit contains an oscillator 59 to apply an AC signal through a pair of capacitors to the diode matrix 60. The oscillator 59 also applies its signal to the shield 53. As indicated, the circumferential ground electrode is appropriately connected to ground. The probe of FIG. 9 acts in a manner as disclosed in the above copending application; at terminals which are connected to the diode matrix by a pair of inductors, a measure of the difference in the capacitance to ground between the measuring electrode and the capacitor C may be obtained as they are excited by the oscillator 59 as the probe's output signal.

With respect to the probe in FIG. 10, a cylindrical housing 68 is provided comprising an outer conductor 67 and an inner dielectric member 69. The measuring electrode 61 is shaped as a sphere and a corresponding balancing electrode 63 is provided. Leads 64 and 77 connect the measuring and balancing electrodes with a diode matrix 60 in the electrical circuit indicated. The circuit also includes an oscillator 59 which is connected to the diode matrix by a pair of capacitive arms. The diode matrix is also connected to a pair of terminals through the inductors shown. At these terminals, one may obtain a measure of the difference in the capacitance to ground between the measuring and balancing electrodes when the oscillator operates to excite the electrodes.

By merely placing the capacitive probes of FIGS. 9 and 10 in a cylinder, top dead center may be ascertained substantially regardless of the angle with which the piston approaches the probe.

It will be appreciated that various changes in the form and details of the described preferred embodiments may be effected by persons of ordinary skill in the art without departing from the true spirit and scope of the invention.

I claim:

1. An apparatus for providing an output signal in response to a reversal in direction of an object moving toward and away from a fixed point, said apparatus comprising:
   a. an active transducer located at said fixed point and adapted to provide an extended signal which varies in accordance with the distance between said fixed point and said moving object, said signal having a peak corresponding to said object's reversal in direction; and,
   b. means for generating an output signal in response to said peak.

2. The apparatus as recited in claim 1 wherein said generating means comprises means for differentiating said transducer signal and means for providing an indication when said differentiated signal crosses zero.

3. The apparatus as recited in claim 2 further comprising:
   a. means responsive to said transducer's signal for providing a gating pulse in response to each peak which corresponds to said object's reversal in direction from moving toward said fixed point to moving away from said fixed point, each said pulse beginning before its associated peak and ending after said peak; and,
   b. wherein said generating means further includes gating means for providing an output signal in response to each indication that said differentiated signal crosses zero during the occurrence of a gating pulse.

4. The apparatus as recited in claim 1 wherein the signal from said transducer has a peak corresponding to said object's reversal in direction from moving toward the said fixed point to moving away from said fixed point.

5. The apparatus as recited in claim 1 wherein said generating means comprises means responsive to said transducer signal for generating a first signal which varies until the peak of said transducer's signal occurs and thereafter crosses zero.

6. The apparatus as recited in claim 5 wherein said generating means further comprises means for indicating when said first signal crosses zero.

7. An apparatus for measuring the distance between the present position of an object moving toward and away from a fixed point and the position at which said object previously reversed direction, said apparatus comprising:
   a. an active transducer located at said fixed point and adapted to provide an extended signal which varies in accordance with the distance between said fixed point and said moving object, said signal having a peak corresponding to said object's reversal in direction;
   b. means for generating a first signal which increases at a rate corresponding to the increase in said transducer signal until the peak of said transducer signal occurs; and,
   c. means for subtracting from the value of the magnitude of said first signal after it stops increasing the present value of the transducer signal.

8. The apparatus as recited in claim 7 wherein said previous direction reversal occurred when said object moved toward said fixed point and thereafter reversed direction.

9. An apparatus for providing an indication corresponding to the difference between the occurrence of an event and the occurrence of a reversal in direction of an object moving toward and away from a fixed point, said apparatus comprising:
  a. an active transducer located at said fixed point and adapted to provide an extended signal which varies in accordance with the distance between said fixed point and said moving object, said signal having a peak corresponding to said object's reversal in direction;
  b. means for generating a first signal at the occurrence of said event;
  c. means for generating a second signal which increases at a rate corresponding to the increase in said transducer signal until the peak of said transducer's signal occurs;
  d. means for continuously subtracting from the value of the magnitude of said second signal after it stops increasing the present value of the transducer signal; and,
  e. means for ascertaining the result of said subtracting means at the time said first signal is generated.

10. The apparatus as recited in claim 9 and further comprising:
  a. means for generating an output signal in response to said peak in said transducer signal; and,
  b. means for indicating whether said output signal lags or leads said first signal generated at the occurrence of said event.

11. The apparatus as recited in claim 10 wherein said direction reversal occurs when said object changes direction from moving toward said point to moving away from said point.

12. An apparatus for providing an indication corresponding to the difference between the occurrence of an event and the occurrence of a reversal in direction of an object moving toward and away from a fixed point, said apparatus comprising:
  a. an active transducer located at said fixed point and adapted to provide an extended signal which varies in accordance with the distance between said fixed point and said moving object, said signal having a peak corresponding to said object's reversal in direction;
  b. means for providing a first signal at the occurrence of said event;
  c. means for providing a second signal at the peak of said transducer signal;
  d. timing means for providing successively advancing output values;
  e. means for initiating operation of said timing means in response to one of said first or second signals;
  f. means for ascertaining the value of said timing means at the time the other of said first or second signals is provided.

13. Apparatus as recited in claim 12 wherein said initiating means comprises switching means connected between said means for providing said first and second signals and said timing and ascertaining means.

14. The apparatus as recited in claim 13 wherein said timing means is adapted to be reset upon reaching a predetermined value and further including means for controlling said switching means to initiate operation of said timing means in response to said second signal when said first signal precedes resetting of said timing means and to initiate operation of said timing means in response to said first signal when said first signal lags resetting of said timing means.

15. The apparatus as recited in claim 14 and further including means for indicating said ascertained value, and means, responsive to said control means, for modifying said ascertained value when said first signal lags resetting of said timing means.

16. The apparatus as recited in claim 12 wherein successive pluralities of said first and second signal are provided, wherein said timing means is adjustable to provide different rates of advance of its output values, and further including means for adjusting said timing means in response to the rate at which said second signals are provided.

17. The apparatus as recited in claim 12 wherein said direction reversal occurs when said object changes direction from moving toward said point to moving away from said point.

18. An apparatus for providing an indication of depressions and rises in a surface, said apparatus comprising;
  a. an active transducer positioned adjacent said surface and adapted to provide an extended output which varies in accordance with the distance between said surface and itself as said surface moves with respect to said transducer past said transducer;
  b. means for defining a cycle corresponding to movement of said surface past said transducer;
  c. means for storing the output value of said transducer occurring at the beginning of said cycle, said output value corresponding to the distance between said transducer and the beginning of said surface; and,
  d. means responsive to said transducer and said storing means for providing an output which varies in response to the difference between said stored output value and the output of said transducer during said cycle to indicate depressions and rises in said surface with respect to the beginning of said surface.

19. The apparatus as recited in claim 18 wherein said output providing means provides a signal which increases when the difference between said stored output value and said transducer output indicates that the distance between said surface and said transducer is either increasing or decreasing from its value at the beginning of said cycle.

20. The apparatus as recited in claim 18 wherein said surface is contained within a larger surface moving with respect to said transducer past said transducer; and said cycle defining means comprises means for providing an index signal at the time a particular point on said larger surface is a predetermined distance from said transducer, means for providing a series of oscillations at a rate corresponding to the rate of movement of said larger surface past said transducer, means for generating a cycle start signal in response to a predetermined number of oscillations occurring after said index signal, said predetermined number corresponding to movement of said larger surface until the beginning of said surface is adjacent said transducer and, means for generating a cycle stop signal in response to a second predetermined number of oscillations occurring after said cycle start signal, said second predetermined number corresponding to movement of said surface past said transducer, and wherein said storing means is operable in response to said cycle start signal and said output providing means is operable between said cycle start and cycle stop signals.

21. The apparatus as recited in claim 18 wherein said surface is contained within a larger surface which is closed and revolves with respect to said transducer to present said larger surface to said transducer; wherein said cycle defining means comprises means for providing an index signal at a definite point in each revolution of said larger surface; means for providing a cycle start signal at a predetermined point of each revolution after each index signal and means for providing a cycle stop signal at a predetermined point of each revolution after each said cycle stop signal, and wherein said storing means is operable in response to said cycle start signal; and said output providing means is operable between said cycle start and cycle stop signals.

22. The apparatus as recited in claim 21 wherein said larger closed surface is a cam comprising a base circle and a lobe, said surface comprises a portion of said base circle and said index signal providing means comprises a second transducer positioned adjacent to said cam and adapted to provide an output in response to said lobe at each revolution.

23. The apparatus as recited in claim 21 wherein said cycle start signal providing means comprises a counter adapted to provide an output in response to a selected number of applied input pulses, said cycle stop signal providing means comprises a second counter adapted to provide an output in response to a second selected number of applied input pulses, and wherein said cycle defining means further comprises means for providing said pulses to be applied to said counters and in timed relationship with said revolving larger surface.

24. An apparatus for providing a measure of the distance traversed by an object moving successively toward and away from a fixed point, said apparatus comprising:
   a. means for defining a cycle during which said object traverses said distance to be measured;
   b. an active transducer positioned at said fixed point and adapted to provide an extended output during said cycle which varies in accordance to the distance between said object and said fixed points;
   c. means for storing the output value of said transducer occurring at the beginning of said cycle, said output value corresponding to the distance between said fixed point and said object at the beginning of said cycle;
   d. means responsive to said transducer and said storing means for providing an output which varies in response to the difference between said stored output and the output of said transducer during said cycle to indicate the distance traversed by the object during said cycle.

25. The apparatus as recited in claim 24 wherein said output providing means provides a signal which increases when the difference between said stored output value and said transducer output indicates that said object is either moving closer to or moving farther away from said fixed point than it was at the beginning of said cycle.

26. A capacitive probe comprising:
   a. a housing having an end;
   b. an essentially spherical measuring electrode attached at the end of said housing, said measuring electrode being adapted to be placed adjacent the situation to be probed;
   c. a balancing electrode;
   d. means for exciting said measuring and balancing electrodes with fluctuating current relative to a ground potential; and
   e. means for providing an indication of the difference in the capacitance to ground between said measuring and balancing electrodes.

27. A capactive probe comprising:
   a. a housing having an end;
   b. a hemispherical measuring electrode attached at the end of said housing, said measuring electrode being adapted to be placed with its spherical surface adjacent the situation to be probed;
   c. a ground-referenced capacitor;
   d. means for exciting said electrode and capacitor with fluctuating current relative to a ground potential; and
   e. means for providing an indication of the difference in the capacitance to ground between said measuring electrode and capacitor.

28. The apparatus as recited in claim 1, wherein said transducer comprises:
   a. a housing having an end;
   b. a hemispherical measuring electrode attached at the end of said housing, said measuring electrode being adapted to be placed with its spherical surface adjacent the situation to be probed;
   c. a ground-referenced capacitor; and
   d. means for exciting said measuring electrode and capacitor with fluctuating current relative to a ground potential, and wherein said transducer signal corresponds to the difference in the capacitance to ground between said measuring electrode and capacitor.

29. The apparatus as recited in claim 7, wherein said transducer comprises;
   a. a housing having an end;
   b. a hemispherical measuring electrode attached at the end of said housing, said measuring electrode being adapted to be placed with its spherical surface adjacent the situation to be probed;
   c. a ground-referenced capacitor; and
   d. means for exciting said measuring electrode and capacitor with fluctuating current relative to a ground potential, and wherein said transducer signal corresponds to the difference in the capacitance to ground between said measuring electrode and capacitor.

30. The apparatus as recited in claim 9, wherein said transducer comprises:
   a. a housing having an end;
   b. a hemispherical measuring electrode attached at the end of said housing, said measuring electrode being adapted to be placed with its spherical surface adjacent the situation to be probed;
   c. a ground-referenced capacitor; and
   d. means for exciting said measuring electrode and capacitor with fluctuating current relative to a ground potential, and wherein said transducer signal corresponds to the difference in the capacitance to ground between said measuring electrode and capacitor.

31. The apparatus as recited in claim 12, wherein said transducer comprises:
  a. a housing having an end;
  b. a hemispherical measuring electrode attached at the end of said housing, said measuring electrode being adapted to be placed with its spherical surface adjacent the situation to be probed;
  c. a ground-referenced capacitor; and
  d. means for exciting said measuring electrode and capacitor with fluctuating current relative to a ground potential, and wherein said transducer signal corresponds to the difference in the capacitance to ground between said measuring electrode and capacitor.

* * * * *